United States Patent [19]

Cottrell et al.

[11] 4,326,970

[45] Apr. 27, 1982

[54] COPOLYMERS OF N,N-DIMETHYLACRYLAMIDE AND ACRYLAMIDE

[75] Inventors: Ian W. Cottrell, Solana Beach; John K. Baird; Jaewon L. Shim, both of San Diego, all of Calif.

[73] Assignee: Merck & Co., Inc., Rahway, N.J.

[21] Appl. No.: 146,531

[22] Filed: May 2, 1980

Related U.S. Application Data

[62] Division of Ser. No. 961,820, Nov. 17, 1978, Pat. No. 4,254,249.

[51] Int. Cl.³ .............................................. E21B 43/22
[52] U.S. Cl. ............................ 252/8.55 D; 166/275
[58] Field of Search ............... 526/303; 252/8.55 D; 166/274, 275

[56] References Cited

U.S. PATENT DOCUMENTS

| | | | |
|---|---|---|---|
| 2,827,964 | 3/1958 | Sandiford et al. | 166/274 |
| 3,039,529 | 6/1962 | McKennon | 166/275 |
| 3,082,178 | 3/1963 | Coover | 260/17 R |
| 3,370,649 | 2/1965 | Wolgemuth | 166/274 |
| 3,804,176 | 4/1974 | Jennings | 252/8.55 D X |

*Primary Examiner*—Herbert B. Guynn
*Attorney, Agent, or Firm*—Gabriel Lopez; Hesna J. Pfeiffer

[57] ABSTRACT

Novel copolymers of N,N-dimethylacrylamide and acrylamide are disclosed where the ratio of NNDMA to AM ranges from 10:90 to 95:5. The hydrolyzed copolymer is also disclosed where hydrolysis ranges from 5% to 65% and the ratio of NNDMA to AM is 5:95 to 95:5. These hydrolyzed copolymers are useful in enhanced oil recovery operations.

5 Claims, No Drawings

COPOLYMERS OF N,N-DIMETHYLACRYLAMIDE AND ACRYLAMIDE

This is a division of application Ser. No. 961,820, filed Nov. 17, 1978, now U.S. Pat. No. 4,254,249.

BACKGROUND OF THE INVENTION

Partially hydrolyzed acrylamide polymers and copolymers are known for the secondary recovery of petroleum. See, e.g., U.S. Pat. Nos. 3,039,529 and 2,827,964 and Canadian Pat. No. 616,967. Needles et al., J. Polymer Sci., part. A. 3 (10), 3543-8 (1965) disclose three copolymers of N,N-dimethylacrylamide and acrylamide (NNDMA and AM) wherein the ratios of NNDMA to AM are 1:10, 1:20, and 1:100. Copolymers with NNDMA:AM ratios greater than 1:10 are not known. Neither are the hydrolyzed forms of NNDMA:AM copolymers.

SUMMARY OF THE INVENTION

The present invention is directed both to linear and cross-linked copolymers of acrylamide and N,N-dimethylacrylamide, and to the hydrolysis products of these copolymers.

DETAILED DESCRIPTION

The copolymers of acrylamide and N,N-dimethylacrylamide of the present invention may be represented by the formula

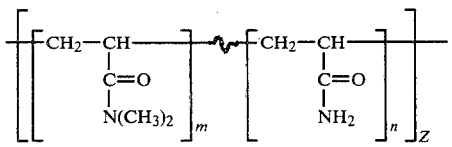

where m and n are whole numbers such that the weight:weight ratio of NNDMA to AM ranges from greater than 10:90 to about 95:5, Z is a number such that the viscosity (1% w/w solution in deionized water, Brookfield LVF viscometer, Spindle 2, 60 rpm) of the copolymer is at least about 55 centipoise (cP), and $\sim\!\!\sim\!\!\sim$ indicates that the distribution of NNDMA and AM in the polymer chain is random. These copolymers are useful for the production of the hydrolyzed copolymers of this invention.

It is preferred that the NNDMA:AM ratio range from about 1:3 to about 3:1. It is also preferred that the value of Z be such that a 1.0% solution of the polymer in deionized water have a viscosity, as measured on a Brookfield LVF viscometer, spindle No. 2 at 60 rpm, of at least 100 cp at 21° C.

Another aspect of this invention is the partially hydrolyzed derivatives of NNDMA:AM copolymers. Degree of hydrolysis ranging from about 5% to about 65% is included within the scope of this invention, by which is meant that about 5% to 65% of the amide groups in the original copolymers are hydrolyzed to carboxyl groups. Included within the scope of this invention are partially hydrolyzed copolymers of Formula I where the NNDMA:AM ratio ranges from greater than 5:95 to about 95:5 and Z is such that a 1.0% solution of the hydrolyzed polymer in deionized water has a viscosity, as measured on a Brookfield LVF viscometer, spindle No. 4 at 60 rpm, of at least 1000 cP at 21° C. It is preferred that hydrolysis range from 10% to 25%. Most preferred is 25% hydrolysis.

Another aspect of this invention is a composition for enhanced oil recovery which comprises an effective amount of a partially hydrolyzed copolymer of Formula I where the NNDMA:AM ratio ranges from greater than 5:95 to about 95:5 and an aqueous medium therefor. Such a composition is effective when the viscosity of the composition ranges from 1.1 cP (Brookfield LVF, UL adaptor, 6 rpm) to 100 cP (Brookfield LVF, UL adaptor, 60 rpm) at 21° C., the preferred viscosity varying with the subterranean conditions. The aqueous medium for such a composition can be either fresh, deionized, distilled, or salt water, again the preferred medium depending on the subterranean conditions. The preferred copolymer for enhanced oil recovery is NNDMA:AM (1:3), hydrolyzed 10-25%.

In the secondary recovery of petroleum by waterflooding, it has been proposed to employ aqueous media rendered more viscous than ordinary water or brine by the incorporation therein of water-soluble agents such as water-soluble polymers. In one such procedure it has been proposed to employ acrylamide polymers hydrolyzed to the extent of between about 0.8 and about 10 percent of the amide groups. However, it has been discovered that such partially hydrolyzed acrylamide polymers having 10 percent or less of the amide groups hydrolyzed to carboxyl groups have certain drawbacks in actual use. Thus, for example, it has been found that acrylamide polymers having 10 percent or less of the amide groups converted to carboxyl groups are strongly adsorbed by mineral constituents of oil sands and are progressively removed from the flooding liquid when such liquid is contacted with the underground strata. This property of said acrylamide polymers requires that much expensive polymer be pumped into the formation merely to satisfy the adsorption requirements of the producing strata.

Similarly, water-soluble polyacrylates and polyacrylic acid have been suggested as agents to render water more viscous for secondary recovery of petroleum. However, such agents precipitate in brines containing calcium and sodium ions such as are generally encountered in the producing strata.

In accordance with the present invention, it has been discovered that water-soluble, high molecular weight, hydrolyzed NNDMA:AM copolymers having from 5 to about 65 percent of the original carboxamide groups hydrolyzed to carboxyl groups, have particularly advantageous properties for preparing viscous aqueous compositions for use in the secondary recovery of petroleum. Thus, the present invention embodies a method of improving the sweeping or driving of petroleum from underground formations through the use of aqueous compositions rendered more viscous by the incorporation therein of hydrolyzed NNDMA:AM copolymers containing from 5 to about 65 and preferably from 10 to about 25 percent hydrolyzed amide groups. It is among the advantages of the invention that the above described copolymers are adsorbed in underground strata to only a minimal extent. It is a further advantage of the invention that said hydrolyzed copolymers are not rendered insoluble by the presence in the solution of concentrations of calcium ions and sodium ions such as are commonly encountered in oil field brines. Yet another advantage of the invention resides in the fact that only very small amounts of the high molecular weight, hydrolyzed copolymers are required to achieve high viscosities in the fluid employed for driving the oil.

Further, the hydrolyzed NNDMA:AM copolymers employed in accordance with the present invention are characterized by high molecular weight. As a result, it is possible to obtain aqueous solutions having a desirably increased viscosity with the use of a minimum amount of the polymeric ingredient. The viscosity of a standard solution of polymer under controlled conditions is correlated with the molecular weight of the copolymer. Accordingly, it has been found that the hydrolyzed copolymers suitable for use in the invention are those characterized by a viscosity of at least 200 cP for a 1.0 percent by weight solution thereof in a brine solution at a temperature of 21° C. as determined with a Brookfield LVF viscometer, spindle 2, 60 rpm. (Brine refers to a solution containing 10,000 ppm Na+ ions and 1000 ppm Ca++ ions, using NaCl and CaCl$_2 \cdot$2H$_2$O.)

In carrying out the invention, the hydrolyzed copolymer is dissolved in water in any suitable fashion to provide a solution having the desired viscosity. Alternatively, the hydrolyzed copolymer may be dissolved in brine or an aqueous solution of said polymer may be diluted with brine to form a solution having ionic constituents similar or identical to those in the connate water in the oil field wherein the secondary recovery procedure is to be employed. In a preferred method of operation, the viscous solution is prepared with oil field brine obtained from the producing strata or from strata adjacent to the producing strata whereby undesired changes in the strata by reason of introduction of the viscous, aqueous fluid are minimized.

In such operations, the concentration of the hydrolyzed copolymer in the water or brine employed to produce the viscous, aqueous fluid may be adjusted to produce the desired viscosity of said fluid. In general, with the NNDMA:AM copolymers preferably employed, that is, with copolymers having a viscosity 200 cP in a 1% brine solution, it is desirable to employ from about 0.1% to 0.5% by weight or more of hydrolyzed copolymer in the viscous, aqueous fluid. In practice, the viscous, aqueous fluid may have a viscosity of from slightly over that of pure water (1.0 cP at 20° C.) to about 1000 cP (Brookfield LVF, Spindle 4, 60 rpm) and preferably from about 1.1 to 100 centipoise (as described above). The exact viscosity to be employed for maximum efficiency in recovery of oil will vary depending upon such factors as the porosity and permeability of the oil-bearing formation, the viscosity of the oil in the formation and the particular type of oil-bearing strata involved. In many cases, good results are obtained when the viscous, aqueous fluid is adjusted to a viscosity ranging from about the viscosity of the oil in place in the producing strata to about ½ the viscosity of such oil.

In the final preparation of the viscous, aqueous fluid for injection into the oil-bearing strata, it is generally essential that the viscous, aqueous fluid be free of undissolved solids which may filter out and plug the face of the formation thus preventing further injection. Conventional filtration operations using a filter-aid such as diatomaceous earth will usually suffice to remove undissolved solids. Similarly, it is desirable to avoid constituents in the viscous, aqueous fluid which may react with the oil bearing strata or the connate water therein, as for example, by the precipitation of inorganic salts in the pores of the formation. It is sometimes desirable to incorporate a sequestering agent such as citric acid or sodium ethylenediamine tetraacetate in the pusher fluid. Other conventional additaments such as antimicrobial agents to prevent the growth of microorganisms in the viscous, aqueous fluid may also be incorporated. It is usually desirable to adjust the pH of the viscous, aqueous fluid to approximately the pH of the connate water in the oil-bearing formation and in any case the viscous, aqueous fluid should be maintained at a pH of from about 5 to 9 in order to avoid undesirable changes in the composition of the hydrolyzed copolymer.

In any particular instance, the minimal concentration of hydrolyzed NNDMA:AM copolymers required to provide effective sweeping of the oil from the formation may be ascertained by laboratory tests on core samples obtained from the field on which secondary recovery is contemplated. In general, it is desirable that such tests be run on several core samples to guard against variations normally encountered in such samples.

The primary limitation in the use of a compound or composition for enhanced oil recovery is its compatibility with brine as manifested by initial viscosity and retained viscosity under conditions of high shear. The hydrolyzed copolymers of this invention demonstrate in brine both superior initial viscosity and retained viscosity after a period of high shear when compared to state-of-the-art hydrolyzed polymers.

The copolymers of the present invention may be prepared by reacting an aqueous solution of the respective monomers with each other in the presence of a free radical initiator. As the copolymerization reaction produces polymer in near quantitative yield, the desired ratio of NNDMA to AM may be obtained by controlling the ratio of NNDMA monomer to AM monomer. The free radical initiator may be a compound such as ammonium persulfate, potassium persulfate, dibenzoyl peroxide or azo-bis-isobutyronitrile. In general the free radical initiator is used in a quantity of from about 0.01% to about 0.1% by weight of total monomers. An activating agent optionally may be present to reduce the activation energy of the free radical initiator and thus greatly increase the rate of decomposition at low temperature or, in other words, to facilitate the initiation of polymerization. The activating agents form a redox system together with the free radical initiator. Any suitable activating agent may be employed, such as the tetrasodium salt of ethylenediamine tetraacetic acid. The activating agent may be present in an amount of from about 0.05% to about 0.5% by weight of total monomers.

The polymerization reaction may be carried out at from about 15° C. to about 75° C. for from about 2 hours to about 24 hours. Generally lower temperatures require longer reaction time while higher temperature require shorter reaction time. Maximum and constant viscosities are obtained after seven hours of reaction time.

In the case of the cross-linked copolymers the reaction is carried out in the presence of a cross-linking agent such as, for example, methylenebisacrylamide, in a quantity ranging from about 0.001% to about 0.1% by weight of total monomers. When the copolymer is to be hydrolyzed, it is preferable not to use a cross-linking agent as such use seems to increase microgel formation.

Hydrolysis can be achieved by several means, preferably by reacting the copolymer solution with a strong base, e.g., KOH. The ratio of polymer to base used will determine the percent of hydrolysis. In a typical hydrolysis, a 40% aqueous KOH solution is reacted with copolymer at 60°–70° C. for 2 hours.

The hydrolyzed copolymers of this invention are preferably employed directly as produced in aqueous solution. However, they may be dried and then flaked or powdered and later reconstituted with water or brine. Drying may be accomplished on a drum dryer or the product may be precipitated from a water-miscible organic solvent such as a lower alcohol, preferably isopropanol, or acetone.

As used throughout this disclosure, values shown for degree of hydrolysis are nominal, being based on the amount of hydrolyzing agent used in the reaction. Analysis of a copolymer hydrolyzed 25% showed an actual percentage hydrolysis of 23.1%.

Dow Pusher 700, used herein for comparative purposes, is a commercially available copolymer which is a standard for enhanced oil recovery. It is a polyacrylamide hydrolyzed about 19% (see U.S. Pat. No. 3,981,363 col. 4, lines 56–57).

The following examples illustrate the present invention without, however, limiting the same thereto.

EXAMPLES 1–3

Preparation of Three 1:1 NNDMA:AM Copolymers

Into a 2 l resin pot, 5.0 g of acrylamide, 5.0 g of N,N-dimethylacrylamide, and 190 ml of $H_2O$ are introduced and prepurged with $N_2$ for 1–2 hours. The reactants are heated to 50° C. in a nitrogen atmosphere. To this mixture is added 4 mg ammonium persulfate (0.4 ml of 1% solution), 16 mg tetrasodium salt of ethylenediamine tetraacetic acid (1.6 ml of 1% solution), and the following amounts of the cross-linking agent methylenebisacrylamide:

Expl. 1–0 g
Expl. 2–0.4 g
Expl. 3–4 g

After heating for 16 hours with $N_2$ purging, samples of each of the three copolymers are prepared as 1% and 0.1% solutions in deionized water and in brine. The viscosities of the resulting 1% solutions are measured using a Brookfield LVF viscometer, spindle No. 2 at 60 rpm, and the viscosities of the resulting 0.1% solutions are measured using the UL adapter at 6 rpm with the following results:

|  | Viscosity (cps) | | |
|---|---|---|---|
|  | Ex. 1 | Ex. 2 | Ex. 3 |
| 1% solution in deionized water | 129 | 155 | 196 |
| 1% solution in brine | 152 | 166 | 225 |
| 0.1% solution in deionized water | 6.1 | 7.0 | 7.5 |
| 0.1% solution in brine | 6.4 | 6.5 | 7.5 |

These results indicate that the copolymers have excellent salt compatibility.

Samples from Examples 1, 2, and 3 are diluted with deionized water to concentrations ranging from 0.5% to 2.3% and their viscosities measured. These solutions are then sheared on a Hamilton Beach blender set at highest speed. Poly-NNDMA and Dow Pusher 700, a commercially available form of 15–45% hydrolyzed polyacrylamide are similarly treated. The following data are obtained:

|  | Viscosity (cps) | | | | |
|---|---|---|---|---|---|
| Shearing Time | Ex. 1 | Ex. 2 | Ex. 3 | Poly-NNDMA | Dow |
| 0 min. | 1004 | 640 | 560 | 1030 | 425 |
| 10 min. | 350 | 130 | 60 | 37.5 | 164 |
| 20 min. | 260 | 84 | 50 | 26.5 | 117 |
| 30 min. | 160 | 70 | 40 | 22.3 | 94 |
| % Retained Vis. after 10 min. | 35% | 20% | 10.5% | 3.6% | 38.5% |

These results indicate that the copolymers have superior shear stability when compared to the NNDMA homopolymer and are somewhat inferior to polyacrylamide.

EXAMPLES 4–11

Preparation of NNDMA:AM Copolymers of Various Ratios

Following the procedure of Example 1 and using no cross-linking agent, copolymers of varying ratios are produced. The following viscosity data are obtained:

|  |  | Viscosity | | | |
|---|---|---|---|---|---|
|  |  | Deionized Water | | Brine | |
| Ex. |  | 0.1% | 1% | 0.1% | 1% |
| 4. | NNDMA:AM (0:100) | 4.2 | 50 | 4.4 | 68 |
| 5. | NNDMA:AM (10:90) | 5.0 | 65 | 4.4 | 98 |
| 6. | NNDMA:AM (15:85) | 4.7 | 55 | 5.7 | 93 |
| 7. | NNDMA:AM (20:80) | 5.4 | 100 | 6.3 | 138 |
| 8. | NNDMA:AM (25:75) | 6.0 | 206 | 6.0 | 276 |
| 9. | NNDMA:AM (50:50) | 6.1 | 129 | 6.4 | 152 |
| 10. | NNDMA:AM (75:25) | 4.8 | 98 | 5.5 | 145 |
| 11. | NNDMA:AM (100:0) | 3.0 | 106 | 4.5 | 121 |

In these examples, the total monomer starting solutions contain 200 g of 5% solutions e.g., the Example 8 starting solution contain 2.5 g NNDMA, 7.5 g AM, and 190 ml $H_2O$.

Following the shear-stability procedure described in Example 1, the following shear-stability data are obtained for 1.5% solutions.

|  | Viscosity (cP) | |
|---|---|---|
| Shearing Time | Ex. 8 | Ex. 10 |
| 0 min. | 950 | 500 |
| 10 min. | 230 | 100 |
| 20 min. | 152 | 60 |
| 30 min. | 150 | 54 |
| % Retained Vis. after 10 min. | 24.2% | 20.0% |
| % Retained Vis. after 30 min. | 15.8% | — |

EXAMPLES 12–14

Partial Hydrolysis of NNDMA:AM 1:3 Copolymers

Three aliquots of the copolymer prepared as described in Example 8 having an NNDMA to AM ratio of 1:3 are treated with the stoichiometric quantity of 40% KOH solution calculated to convert 10%, 25% and 50% respectively, of the available primary amide groups to carboxyl groups. The hydrolysis is carried out at about 65° C. for 2 hours. The final copolymer solutions are diluted with deionized (DI) water, or brine and the viscosities and shear stability are measured as described in Example 1 to give the following results. For purposes of comparison, comparable solutions of Dow Pusher 700 are prepared and measured.

|  | Ex. 12 10% | Ex. 13 25% | Ex. 14 50% | Dow Pusher 700 |
|---|---|---|---|---|
| 1% Vis. |  |  |  |  |
| DI | 1530 | 2400 | 2670 | 1280 |
| Brine | 203 | 370 | 402 | 120 |
| 0.1% Vis. |  |  |  |  |
| Brine | 5.5 | 6.6 | 6.5 | 5.0 |

These examples show the unexpectedly high viscosities of the partially hydrolyzed copolymers in brine.

0.5% solutions of the three hydrolyzed copolymers are prepared for the shear-stability tests.

|  | Viscosity (cps) | | | Dow Pusher |
|---|---|---|---|---|
| Shearing Time | Ex. 12 | Ex. 13 | Ex. 14 | 700 |
| 0 min. | 472 | 750 | 830 | 425 |
| 10 min. | 254 | 570 | 640 | 164 |
| 20 min. | 190 | 480 | 530 | 117 |
| 30 min. | 160 | 430 | 460 | 94 |
| % Ret. Vis. after 10 min. | 53.8% | 76.0% | 77.1% | 38.6% |
| % Ret. Vis. after 20 min. | 33.9% | 57.3% | 55.4% | 22.1% |

These results show the enhanced shear stability of the hydrolyzed copolymers of the instant invention.

For purposes of injectivity tests, 0.1% brine solutions of the three partially hydrolyzed products of Examples 12–14 are prefiltered through coarse filter paper (Whatman No. 54) and their viscosities measured using a Brookfield LVF viscometer with UL adapter at 6 rpm. They are then filtered through a 1.2μ Millipore filter (Millipore Corp., Bedford, Mass. 01730) at 20 psi applied pressure and their viscosities measured again as described above. The following results are obtained:

|  | Viscosity (cps) | | | Dow Pusher |
|---|---|---|---|---|
|  | Ex. 12 | Ex. 13 | Ex. 14 | 700 |
| Before Millipore Filtration | 5.3 | 6.5 | 6.9 | 5.0 |
| After Millipore Filtration | 5.6 | 6.4 | 6.5 | 4.5 |
| pH | 7.95 | 8.6 | 9.64 |  |

The flow rate vs cumulative throughput data for these 0.1% brine solutions are tabulated as shown below:

| Cumulative Throughput (ml) | Flow Rate/ (ml/sec) | | | Dow Pusher |
|---|---|---|---|---|
|  | Ex. 12 | Ex. 13 | Ex. 14 | 700 |
| 25 | 0.5 | 0.52 | 0.36 | 0.44 |
| 50 | 0.48 | 0.48 | 0.28 | 0.36 |
| 100 | 0.45 | 0.41 | 0.18 | 0.27 |
| 200 | 0.43 | 0.32 | 0.12 | 0.16 |
| 300 | 0.38 | 0.26 | 0.09 | 0.1 |
| 400 | 0.37 | 0.23 | 0.07 | — |

EXAMPLE 15

NNDMA:AM (1:3) Copolymer Hydrolyzed 25%

Following the procedure of Example 13, NNDMA:AM (1:3) copolymer is produced and hydrolyzed 25%. The following data are obtained.

| Viscosity (Brookfield LVF, Spindle 4 at 60 rpm), 1% DI | 2700 |
|---|---|
| Viscosity (Brookfield LVF, Spindle 2 at 60 rpm), 1% brine | 364 |
| Viscosity (Brookfield LVF, UL adapter at 6 rpm), 0.1% brine | 6.4 |
| Initial viscosity, 0.5% in DI | 810 |
| After 10 min. shearing | 592 |
| After 20 min. shearing | 480 |
| After 30 min. shearing | 408 |
| % Ret. Vis. after 10 min. | 73.1% |

0.1% brine solutions (1000 ppm NaCl, 100 ppm $CaCl_2.2H_2O$) are prepared and viscosities measured at 24° C.; 90° C. (after 1 hr. of heating); 24° C. (after cooling). The following data are obtained:

| 24° | 93.9 cps | (UL, 6 rpm) |
|---|---|---|
| 90° | 50.2 cps | (UL, 6 rpm) |
| 24° | 93.7 cps | (UL, 6 rpm) |

These data show the heat stability of the hydrolyzed copolymer.

EXAMPLES 16–18

Hydrolysis of NNDMA:AM (1:1) Copolymer

The polymer of Example 1 is hydrolyzed following the procedures of Examples 12–14 and the following data are obtained:

| Viscosity (cps) | Ex. 16 (10%) | Ex. 17 (25%) | Ex. 18 (50%) |
|---|---|---|---|
| 1% brine | 132 | 176 | 216 |
| 0.1% brine | 5.0 | 5.1 | 5.2 |

EXAMPLES 19–22

25% Hydrolysis of NNDMA:AM Copolymers of Various Ratios

Following the procedures of Examples 12–14 but shortening the polymerization time to seven rather than 16 hours, NNDMA:AM copolymers of ratios 5:95, 10:90, 15:85, and 20:80 are produced. Viscosity data are obtained on a Brookfield LVF viscometer, as described in Example 15. The percent retained viscosity data after shearing are obtained as described in Example 1 except that the copolymers are diluted to 2% concentrations in 8.8% brine. Comparable data for 25% hydrolyzed polyacrylamide are shown for comparisons.

|  | Viscosity | | | |
|---|---|---|---|---|
|  | DI Water | | Brine | |
| Ex. | 0.1% | 1% | 0.1% | 1% |
| 19. NNDMA:AM ( 5:95) | 28.8 | 1914 | 4.9 | 283 |
| 20. NNDMA:AM (10:90) | 126 | 2590 | 6.5 | 329 |
| 21. NNDMA:AM (15:85) | 127 | 2500 | 6.9 | 336 |
| 22. NNDMA:AM (20:80) | 132 | 2510 | 6.2 | 316 |
| 23. NNDMA:AM (0:100) |  | 2600 | 4.6 | 184 |

% Ret. Vis. After

-continued

| Ex. | 10 Min. Shear (8.8% Brine)* |
|---|---|
| 19 ( 5:95) | 16.8 |
| 20 (10:90) | 27.5 |
| 21 (15:85) | 30.8 |
| 22 (20:80) | 41.0 |
| 23 ( 0:100) | 16.8 |

*Brine for the shear test contains 8% NaCl and 0.8% CaCl₂ . 2H₂O.

These data show that by increasing the NNDMA content above 5%, there is a surprising and unexpected improvement in both brine compatibility and shear stability.

EXAMPLE 23

Determination of Actual Percentage of Hydrolysis 100 g of an 0.1% solution of NNDMA:AM (25:75 copolymer, nominally hydrolyzed 25% is prepared and acidified with 0.1 N HCl (7.4 ml) to pH 2.5. Using a pH meter as an indicator, 3.0 ml of 0.1 N NaOH is used to back-titrate the acidified copolymer from pH 3.3 to 7.0. From these data, the actual percentage of hydrolysis is calculated to be 23.1%.

EXAMPLES 24–26

Berea Core Testing

Samples are prepared of 25% hydrolyzed NNDMA:AM 25:75, partially hydrolyzed polyacrylamide, and Dow Pusher 700 at a concentration of 1000 ppm polymer in 1000 ppm NaCl and 100 ppm CaCl₂. The following viscosity data are obtained.

|  | Viscosity (cP) |
|---|---|
| Ex. 24 NNDMA:AM | 88.6 |
| Ex. 25 Polyacrylamide | 35 |
| Ex. 26 Dow Pusher | 21.2 |

These solutions are injected at a constant pressure of 80 psi into low permeability (<100 millidarcies), consolidated sandstone, Berea cores 2.22 cm long, 6.45 cm² in cross-section, with 21% porosity. The following data are collected.

|  | Pore Volume Injected | Flow Rate |
|---|---|---|
| Ex. 24 | ≈445 | Unchanged throughout run |
| Ex. 25 | ≈600 | Unchanged throughout run |
| Ex. 26 | ≈590 | Decrease in flow rate immediately observable and continuing till end of run |

EXAMPLES 27 AND 28

The polymers of Examples 24 and 25 are dissolved in sea water at a concentration of 1000 ppm. Under similar conditions as Examples 24–26, the following data are obtained.

| | Viscosity (cP) | Pore Volume Injected | Flow Rate |
|---|---|---|---|
| Ex. 27 | 5.0 | ≈500 | Slight increase, leveling off after 260 pore volumes |
| Ex. 28 | 4.6 | ≈540 | Slight increase, leveling off after 200 pore volumes |

What is claimed is:

1. In a process for recovering petroleum from a subterranean oil-bearing formation which comprises introducing into an input well penetrating said formation a viscous, aqueous fluid comprising an aqueous solution of a water-soluble organic polymer and forcing said viscous, aqueous fluid through said formation towards at least 1 output well penetrating said formation at a distance from said input well, the improvement which consists in employing as the water-soluble polymer an effective, viscosity-increasing amount of a hydrolyzed form of the copolymer of N,N-dimethylacrylamide and acrylamide of the formula:

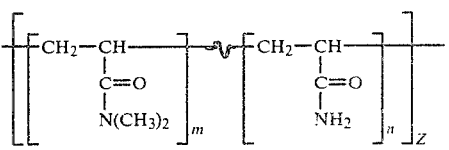

where
m and n are whole numbers such that the weight:weight ratio of NNDMA to AM ranges from greater than 5:95 to about 95:5;
Z is a number such that the viscosity of the hydrolyzed copolymer is at least about 1000 cP (1% w/w solution in deionized water, Brookfield LVF viscometer, spindle 4, 60 rpm); and
∿ indicates that the distribution of NNDMA and AM in the polymer chain is random
wherein the percent of hydrolysis which produces carboxyl groups ranges from about 5% to about 65%.

2. The process of claim 1 wherein the NNDMA:AM ratio ranges from 1:3 to 3:1 and the percent hydrolysis ranges from about 10% to about 25%.

3. The process of claim 2 wherein the NNDMA:AM ratio is about 1:3.

4. A viscous, aqueous fluid for recovering petroleum from a subterranean oil-bearing formation which comprises a solution in water, deionized water or brine of an effective, viscosity-increasing amount of the hydrolyzed form of the copolymer of N,N-dimethylacrylamide and acrylamide of the formula:

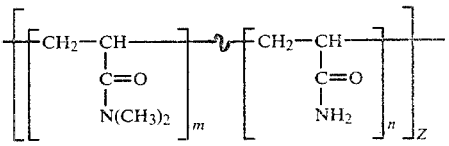

where
m and n are whole numbers such that the weight:weight ratio of NNDMA to AM ranges from greater than 5:95 to about 95:5;
Z is a number such that the viscosity of the hydrolyzed copolymer is at least about 1000 cP (1% w/w solution in deionized water, Brookfield LVF viscometer, spindle 4, 60 rpm); and
∿ indicates that the distribution of NNDMA and AM in the polymer chain is random
wherein the percent of hydrolysis which produces carboxyl groups ranges from about 5% to about 65%.

5. A viscous, aqueous fluid of claim 4 wherein the NNDMA:AM ratio is about 1:3, the hydrolysis ranges from about 10% to about 25% and the viscous, aqueous fluid has a viscosity of from about 1.1 to about 100 cP.

* * * * *